United States Patent [19]

Horak et al.

[11] Patent Number: 4,525,283
[45] Date of Patent: Jun. 25, 1985

[54] PROCESS FOR THE DECONTAMINATION OF EFFLUENTS

[75] Inventors: Otto Horak, Cologne; Werner Falkenberg, Leverkusen; Rolf Müders, Cologne; Werner Beinert, Leverkusen, all of Fed. Rep. of Germany

[73] Assignee: Bayer Aktiengesellschaft, Leverkusen, Fed. Rep. of Germany

[21] Appl. No.: 516,168

[22] Filed: Jul. 21, 1983

[30] Foreign Application Priority Data

Jul. 31, 1982 [DE] Fed. Rep. of Germany ....... 3228625
May 4, 1983 [DE] Fed. Rep. of Germany ....... 3316265

[51] Int. Cl.³ .............................................. C02F 1/72
[52] U.S. Cl. .................................... 210/762; 210/763; 210/909
[58] Field of Search ............... 210/757, 761, 762, 763, 210/909

[56] References Cited

U.S. PATENT DOCUMENTS

| | | | |
|---|---|---|---|
| 2,665,249 | 1/1954 | Zimmerman | 210/761 |
| 3,505,361 | 4/1970 | Greco | 260/385 |
| 3,586,623 | 6/1971 | Kuhn | 210/763 |
| 3,617,581 | 11/1971 | Wang | 210/909 |
| 3,817,862 | 6/1974 | Hoke | 210/763 |
| 3,919,264 | 11/1975 | Greco | 260/385 |
| 4,053,404 | 10/1977 | Van Kirk | 210/761 |
| 4,115,264 | 9/1978 | McCarthy | 210/762 |
| 4,124,505 | 11/1978 | Horak | 210/762 |
| 4,145,283 | 3/1979 | Topp | 210/761 |
| 4,174,280 | 11/1979 | Pradt | 210/761 |
| 4,278,635 | 7/1981 | Kerst | 210/757 |
| 4,334,956 | 6/1982 | Farrington | 210/763 |
| 4,367,123 | 1/1983 | Fiorucci | 210/757 |

FOREIGN PATENT DOCUMENTS

| | | | |
|---|---|---|---|
| 2055860 | 5/1972 | Fed. Rep. of Germany | 210/763 |
| 2253556 | 5/1974 | Fed. Rep. of Germany | 210/763 |
| 523499 | 5/1972 | Japan | 210/763 |
| 53-13099 | 6/1978 | Japan | 210/757 |
| 54-42851 | 4/1979 | Japan | 210/763 |
| 326112 | 6/1929 | United Kingdom | 210/909 |
| 2034684 | 3/1980 | United Kingdom | 210/761 |
| 2043045 | 6/1980 | United Kingdom | 210/763 |
| 488792 | 6/1972 | U.S.S.R. | 210/763 |
| 521232 | 9/1976 | U.S.S.R. | 210/909 |

*Primary Examiner*—Ernest G. Therkorn
*Attorney, Agent, or Firm*—Sprung, Horn, Kramer & Woods

[57] ABSTRACT

A process for the decontamination of an effluent loaded with organic substances, which effluent has, where appropriate after the addition of a redox system, a redox potential of 300–600 mv measured at a platinum electrode versus a silver/silver chloride electrode, comprising oxidizing the effluent with oxygen or an oxygen-containing gas at a pH of 1 to 4, a temperature of 50° to 200° C. and a pressure of 1 to 60 bar in the presence of a redox catalyst and a co-catalyst comprising coal, lignite or peat which has been pretreated with alkali.

3 Claims, 1 Drawing Figure

PROCESS FOR THE DECONTAMINATION OF EFFLUENTS

Large amounts of effluents, the biological decontamination of which is impossible or only inadequate, are produced by industry. In order for it to be possible to discharge these effluents into the environment, they must be decontaminated by special processes. One of the most important processes is wet oxidation which is also known by the name of wet combustion.

In this process, the effluent containing organic substances is heated to temperatures up to 350° C. and simultaneously brought into contact with oxygen-containing gases at pressures up to 250 bar. This oxidises the organic substances in the effluent to give $CO_2$ and $H_2O$. Serious problems with materials for reactors, heat-exchangers and fittings arise from the high temperatures necessary for this process. In practice, when $Cl^-$ ions are present, the only suitable materials are titanium or tantalum. Since external supply of heat is virtually impossible at these high temperatures and pressures, the use of high temperatures ($>250°$ C.) is only economic for heavily loaded effluents which produce an adequate heat of reaction.

In order to lower the temperatures necessary for oxidation (and consequently also the pressures), it has already been proposed that effluents loaded with organic materials be treated with oxygen or oxygen-containing gases at a redox potential of 300-600 mv which is set up by the addition of redox systems, preferably $Fe^{2+}/Fe^{3+}$. It was possible by this means to lower the reaction temperatures to markedly below 250° C. (compare German Offenlegungsschriften Nos. 2,559,374 and 2,657,377).

With this process, the best results are achieved in the temperature range 150°-230° C.

It has now been found that this temperature range can be considerably further decreased when benzoquinones or naphthoquinones, or substances which form the quinones when oxygen is supplied, are added as cocatalysts to the effluent, or these quinoidal compounds are produced directly from suitable organic substances present in the effluent by alkaline pretreatment of the effluent, which has been set to a redox potential of 300-600 mv in a known manner, and the oxidation is carried out at pH 1-4, preferably 1.5-2.5, temperatures of 50°-200° C., preferably 100°-180° C., and under pressures of 1-60 bar. The redox potential for this purpose is measured at a platinum electrode versus a silver/silver chloride electrode, advantageously in a so-called bypass.

Examples of suitable cocatalysts are: benzoquinone, 1,4-naphthoquinone, 2,6-naphthoquinone, hydroquinone, p-aminophenol, p-methoxyphenol, p-phenylenediamine and p-aminoanisole, but also lignite and coal, as well as peat, which have been treated with alkali. This treatment is carried out at temperatures of 50°-250° C., with, for example, NaOH, KOH, $Na_2CO_3$ (in a melt or in the form of the aqueous solutions), ammonia solution and many others. Lignite powder treated in this manner is preferred. Organic residues from distillation, for example residues from isocyanate production according to German Patent Specification No. A 2,846,815 are also well suited after similar treatment with alkali. About 1-5 g of the alkali-treated coal and residue products are employed per liter of effluent.

The other abovementioned cocatalysts are added to the effluents in amounts of 0.01-0.5, preferably 0.05-0.2%.

Compounds which do not form quinones simply when oxygen is supplied, such as, for example, monohydric phenols, are converted into compounds forming quinones or quinoidal systems in a previous reaction step, for example by alkaline wet oxidation at elevated temperatures (100°-140° C.).

The new process is suitable for cleaning up any type of industrial effluents loaded with organic materials, especially for decontaminating heavily loaded mother liquors as are produced during the manufacture of dyestuffs and dyestuff intermediates.

Apart from the $Fe^{2+}/Fe^{3+}$ system already mentioned for setting up the redox potential to be maintained according to the invention, the systems listed on page 4 (bottom) of German Offenlegungsschrift No. 2,559,374 (corresponds to U.S. Pat. No. 4,124,505, column 1, bottom) are also suitable.

If the effluents contain organic substances with oxidising actions, such as, for example, nitroaromatics, it is advisable also to add reducing agents, such as, for example, $N_2H_4$, $SO_2$, $Na_2S$ or iron turnings, in order, for example, to convert these nitroaromatics into amines.

The process can be carried out, for example, in one step in apparatus as is described in German Offenlegungsschrift No. 2,559,374 (page 6) or U.S. Pat. No. 4,124,505 (column 1).

This procedure is preferably employed using "ready" quinones or substances forming quinones, such as benzoquinone, hydroquinone, p-aminophenol, p-methoxyphenol or alkali-treated coals and isocyanate residues.

It is not necessary to use the quinones or substances forming quinones in the pure form. On the contrary, it is advantageous to mix effluents containing these substances with effluents not containing compounds of this type.

In contrast, the process is preferably carried out in two steps when the cocatalysts are produced from suitable substances in the effluent (preferably benzene and naphthalene derivatives containing OH, $NH_2$ or $SO_3H$ groups, such as, for example, phenol, p-nitrophenol, crehols, naphthols, benzenesulphonic acids and the like).

BRIEF DESCRIPTION OF THE DRAWING

In this special embodiment, the process is carried out in a device according to FIG. I.

DETAILED DESCRIPTION OF THE DRAWINGS

Figure 1:
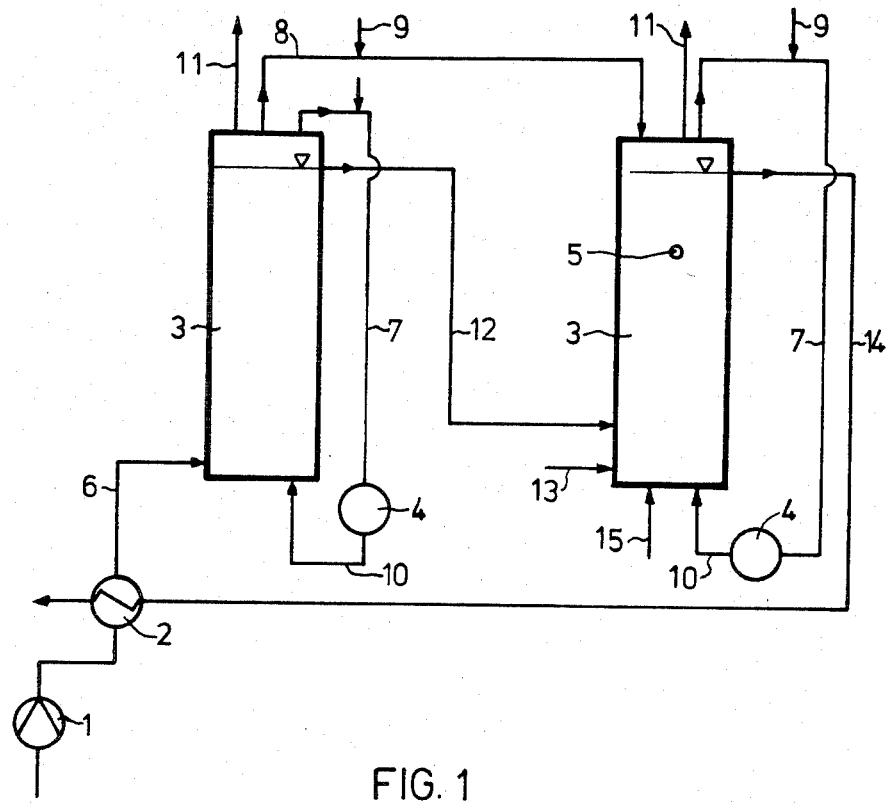

In this FIGURE, the numbers have the following particular meanings:
(1) effluent transporting pump
(2) countercurrent heat-exchanger
(3) bubble column
(4) gas circulating pump
(5) point of measurement for determination of the redox potential
(6) effluent supply line
(7) gas circulating pipe
(8) gas transfer pipe
(9) supply line for oxygen-containing gas
(10) inlet for oxygen-containing gas
(11) waste gas pipe
(12) effluent overflow
(13) redox system inlet

(14) discharge line for oxidised effluent
(15) supply line for acid.

When carrying out the process in practice, the phenol-containing alkaline effluent, such as is produced, for example, during the preparation of 1,5-diphenoxyanthraquinone by reaction of 1,5-dinitroanthraquinone with phenol in the presence of alkali is supplied via (1) and (2) to the bubble column (3). The effluent is here treated with oxygen-containing gas (preferably molecular oxygen) at 100°–140° C. for about 15–30 minutes.

Thereafter, the effluent which has been thus pretreated is transferred via (12) into a second bubble column (3) where it is made acid (advantageously with waste sulphuric acid), the redox system is added and it is treated with oxygen-containing gases (for example technically pure oxygen).

The effluents treated by the process according to the invention have been freed from the "organic loading" to such an extent that they can be directly discharged for final biological decontamination in appropriate clarification plants.

In the following text, the process according to the invention is illustrated by some examples.

Phenol was selected as the organic test substance in these examples as being representative of other organic substances, but this is not intended to signify a restriction of the process according to the invention.

EXAMPLE 1

The oxidation of 3 l of phenol-containing effluent, which contained 2 g/l of phenol and to which 0.3 g/l of benzoquinone had been added, was carried out in an autoclave at a temperature of 140° C., under a partial pressure of oxygen $P_{O2}\simeq 3$ bar, a pH of about 1.8 and a redox potential between 300 and 420 millivolts (measured outside the reaction container at 25° C. using a platinum electrode versus a silver/silver chloride electrode). The redox potential was set up by the addition of 1.6 g/l of $FeSO_4.7H_2O$. About 70% of the dissolved organic carbon (DOC) had been eliminated after 90 minutes.

When the process is carried out as described above, but the cocatalysts indicated in the following table are used, then similarly good results of decontamination are obtained:

| Example no. | DOC elimination after 90 minutes [%] | Cocatalyst |
|---|---|---|
| 2 | 55 | 0.33 g/liter hydroquinone |
| 3 | 80 | 0.33 g/liter pyrogallol |
| 4 | 80 | 0.5 g/liter 1,4-dihydroxynaphthalene |
| 5 | 75 | 0.33 g/liter 4-aminophenol |
| 6 | 85 | 1.0 g/liter 6-amino-2-hydroxynaphthalene |
| 7 | 55 | 0.7 g/liter 2,4-diaminophenol |
| 8 | 40 | 0.7 g/liter 4-methoxyphenol |
| 9 | 80 | 0.7 g/liter gallic acid |
| 10 | 80 | 0.4 g/liter 6-amino-3-hydroxytoluene |
| 11 | 85 | 0.7 g/liter 5-amino-2-hydroxy-3-sulphobenzoic acid |
| 12 (comparison) | 10 | none |

EXAMPLE 13

3 l of water, which contained about 2 g/l of phenol, were oxidised in an autoclave at a temperature of 140° C., under a partial pressure of oxygen $P_{O2}\simeq 3$ bar and a pH of about 12.5 for half an hour. The DOC elimination was about 3%. The water thus treated was then adjusted to pH 1.8, 2.5 g/l of $FeSO_4.7H_2O$ were added and oxidation was continued at a redox potential between 320 and 425 mv at the same temperature and pressure. About 75% DOC was eliminated after 90 minutes.

EXAMPLE 14

As in Example 15, but maintained at 140° C. and pH 12.5 for half an hour in the absence of $O_2$. After the subsequent acidic oxidation, about 73% of the DOC was eliminated.

EXAMPLE 15

3 l of an effluent, which contained nitroaromatics as produced, for example, in the synthesis of nitrostilbene acid, were oxidised at 180° C., a partial pressure of $O_2$ $P_{O2}\simeq 5$ bar, pH 2 and a redox potential between 300 and 350 mv, but without cocatalyst. The redox potential was set up by the addition of 2.5 g/l of $FeSO_4.7H_2O$. Only about 35% of the DOC was eliminated after 90 minutes.

EXAMPLE 16

3 l of the same effluent as in Example 15 were adjusted to pH$\simeq$12 with NaOH, 2 g/l of $Na_2S$ were added, and the temperature was maintained at 140° C. in the absence of oxygen for 30 minutes. The effluent was then oxidised at 180° C., $P_{O2}\simeq 5$ bar, pH 2 and a redox potential between 300 and 380 mv. The redox potential was set up by the addition of 2.5 g/l of $FeSO_4.7H_2O$. About 80% of the DOC had been eliminated after 90 minutes.

EXAMPLE 17

3 g of dried and finely milled lignite were stirred in a conical flask with 6 ml of NaOH (48% strength) and 10 ml of $H_2O$ at 100° C. for one hour. The entire contents of the flask were then added to 3 l of $H_2O$ which contained about 2 g/l of phenol and the oxidation was carried out as described in Example 1. About 70% of the DOC had been eliminated after 90 minutes.

EXAMPLE 18

The process is carried out as in Example 17 but with 3 g of coal. About 60% of the DOC had been eliminated after 90 minutes.

We claim:

1. A process for the decontamination of an effluent loaded with organic substances, which effluent has, where appropriate after the addition of a redox system, a redox potential of 300–600 mv measured at a platinum electrode versus a silver/silver chloride electrode, comprising oxidizing the effluent with oxygen or an oxygen-containing gas at a pH of 1 to 4, a temperature of 50° to 200° C. and a pressure of 1 to 60 bar in the presence of a redox catalyst and a co-catalyst comprising coal, lignite or peat which has been pretreated with alkali.

2. Process according to claim 1, characterised in that the oxidation is carried out at 100°–180° C.

3. Process according to claim 1, characterised in that the oxidation is carried out at pH 1.5–2.5.

* * * * *